(12) United States Patent
Hama et al.

(10) Patent No.: US 11,745,362 B2
(45) Date of Patent: Sep. 5, 2023

(54) ROBOT, ATTACHMENT METHOD, AND DETACHMENT METHOD

(71) Applicant: Seiko Epson Corporation, Tokyo (JP)

(72) Inventors: Hidenori Hama, Shiojiri (JP); Yuta Ichimiya, Matsumoto (JP); Shingo Hoshino, Hokuto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/582,403

(22) Filed: Jan. 24, 2022

(65) Prior Publication Data

US 2022/0234220 A1    Jul. 28, 2022

(30) Foreign Application Priority Data

Jan. 25, 2021   (JP) ................................ 2021-009739

(51) Int. Cl.
  *B25J 17/00*  (2006.01)
  *B25J 19/00*  (2006.01)
  *B25J 9/00*   (2006.01)

(52) U.S. Cl.
  CPC ............ *B25J 17/00* (2013.01); *B25J 9/0009* (2013.01); *B25J 19/0066* (2013.01)

(58) Field of Classification Search
  CPC . B25J 17/00; B25J 9/0009; B25J 9/126; B25J 9/102; B25J 17/0241; B25J 19/0066; B23P 19/04
  See application file for complete search history.

(56) References Cited

U.S. PATENT DOCUMENTS

| | | | | |
|---|---|---|---|---|
| 5,823,061 A * | 10/1998 | Tomiyasu | ............... | B25J 9/047 901/23 |
| 7,230,402 B2 * | 6/2007 | Kumagai | ............. | B25J 17/0241 901/1 |
| 9,827,682 B2 * | 11/2017 | Adachi | .................... | B25J 9/108 |
| 10,195,745 B2 * | 2/2019 | De Castelbajac | ....... | B25B 11/02 |
| 10,632,628 B2 * | 4/2020 | Hasuo | .................. | B25J 19/0066 |
| 10,906,194 B2 * | 2/2021 | Yoneda | .................. | B25J 17/025 |
| 10,933,524 B2 * | 3/2021 | Chikara | ............... | B25J 19/0066 |
| 10,967,528 B2 * | 4/2021 | Ibayashi | ............... | B25J 19/0008 |
| 11,161,256 B2 * | 11/2021 | Tanno | .................. | B25J 19/0016 |

(Continued)

FOREIGN PATENT DOCUMENTS

JP    2019-111598 A    7/2019

*Primary Examiner* — Gregory Robert Weber
(74) *Attorney, Agent, or Firm* — Harness, Dickey & Pierce, P.L.C.

(57) ABSTRACT

A robot includes a first member having a first mounting surface facing upward and a second member having an opening at an upside of the first member and facing the first member and a second mounting surface at the upside, and a joint actuator coupling the first and second members. The joint actuator has a flange fixed to the second mounting surface, a motor placed at the upside with respect to the flange, and a reducer placed at a downside with respect to the flange, projecting downward from the opening, and fixed to the first mounting surface. The joint actuator is mounted on the second mounting surface from the upside and the reducer is projected downward from the opening, and the flange is fastened to the second member from the upside using first screws and the reducer is fastened to the first member from the downside using second screws.

5 Claims, 16 Drawing Sheets

(56) References Cited

U.S. PATENT DOCUMENTS

| | | | |
|---|---|---|---|
| 2015/0246450 A1* | 9/2015 | Yoneda | B25J 9/101 901/49 |
| 2016/0288321 A1 | 10/2016 | Adachi et al. | |
| 2017/0095934 A1* | 4/2017 | Wang | B25J 9/102 |
| 2019/0193286 A1 | 6/2019 | Hasuo | |

* cited by examiner

ROBOT, ATTACHMENT METHOD, AND DETACHMENT METHOD

The present application is based on, and claims priority from JP Application Serial Number 2021-009739, filed Jan. 25, 2021, the disclosure of which is hereby incorporated by reference herein in its entirety.

BACKGROUND

1. Technical Field

The present disclosure relates to a robot, an attachment method, and a detachment method.

2. Related Art

JP-A-2019-111598 discloses a robot having a first joint member, a second joint member pivotable around an axial line relative to the first joint member, a reducer coupling the first joint member and the second joint member, and a motor coupled to the reducer. In the robot of JP-A-2019-111598, in order to prevent separation of the first joint member and the second joint member when the reducer is detached, the first joint member and the second joint member are coupled in another part than the reducer.

However, in the robot of JP-A-2019-111598, it is necessary to first detach the motor, and then, detach the reducer. Accordingly, there are many steps for detaching the reducer, and work therefor may become complex.

SUMMARY

A robot according to an aspect of the present disclosure includes a first member having a first mounting surface, a second member having an opening located at the first mounting surface side with respect to the first member and facing the first member, and a second mounting surface located at an opposite side to the first member, and a joint actuator coupling the first member and the second member and relatively pivoting the first member and the second member, the joint actuator has a flange fixed to the second mounting surface, a motor placed at an opposite side to the first member with respect to the flange, and a reducer placed at the first member side with respect to the flange, projecting from the opening to the first member side, and fixed to the first mounting surface, a width of the opening is smaller than a width of the flange, a width of the motor is smaller than the width of the flange, and a width of the reducer is smaller than the width of the opening, wherein the joint actuator is mounted on the second mounting surface from the opposite side to the first member and the reducer is projected from the opening to the first member side, the flange is fastened to the second member from the opposite side to the first member using a first screw, the reducer is fastened to the first member from an opposite side to the second member using a second screw, and the first member and the second member are coupled.

An attachment method according to an aspect of the present disclosure is an attachment method for a joint actuator coupling a first member having a first mounting surface and a second member having an opening located at the first mounting surface side with respect to the first member and facing the first member, and a second mounting surface located at an opposite side to the first member, and relatively pivoting the first member and the second member, the joint actuator has a flange fixed to the second mounting surface, a motor placed at an opposite side to the first member with respect to the flange, and a reducer placed at the first member side with respect to the flange, projecting from the opening to the first member side, and fixed to the first mounting surface, a width of the opening is smaller than a width of the flange, a width of the motor is smaller than the width of the flange, and a width of the reducer is smaller than the width of the opening. The method includes mounting the joint actuator on the second mounting surface from the opposite side to the first member and projecting the reducer from the opening to the first member side, fastening the flange to the second member from the opposite side to the first member using a first screw, and fastening the reducer to the first member from an opposite side to the second member using a second screw.

A detachment method according to an aspect of the present disclosure is a detachment method for a joint actuator coupling a first member having a first mounting surface and a second member having an opening located at the first mounting surface side with respect to the first member and facing the first member, and a second mounting surface located at an opposite side to the first member, and relatively pivoting the first member and the second member, the joint actuator has a flange fixed to the second mounting surface, a motor placed at an opposite side to the first member with respect to the flange, and a reducer placed at the first member side with respect to the flange, projecting from the opening to the first member side, and fixed to the first mounting surface, a width of the opening is smaller than a width of the flange, a width of the motor is smaller than the width of the flange, a width of the reducer is smaller than the width of the opening, the flange is fixed to the second member from the opposite side to the first member by a first screw, and the reducer is fixed to the first member from an opposite side to the second member by a second screw. The method includes removing the second screw, removing the first screw, and pulling out the joint actuator to the opposite side to the first member.

A fixing member according to an aspect of the present disclosure is a fixing member fixing a first member and a second member when a joint actuator is detached from a robot or when the joint actuator is attached to the robot having the first member, the second member, and the joint actuator coupling the first member and the second member and relatively pivoting the first member and the second member, and the member includes a first insertion hole through which a screw used for fixation to the first member is inserted, and a second insertion hole through which a screw used for fixation to the second member is inserted.

A maintenance system according to an aspect of the present disclosure fixes a first member and a second member by a fixing member when a joint actuator is detached from a robot or when the joint actuator is attached to the robot having the first member, the second member, and the joint actuator coupling the first member and the second member and relatively pivoting the first member and the second member.

DESCRIPTION OF EXEMPLARY EMBODIMENTS

As below, a robot, an attachment method, a detachment method, a fixing member, and a maintenance system according to the present disclosure will be explained in detail based on embodiments shown in the accompanying drawings.

Figure 1:
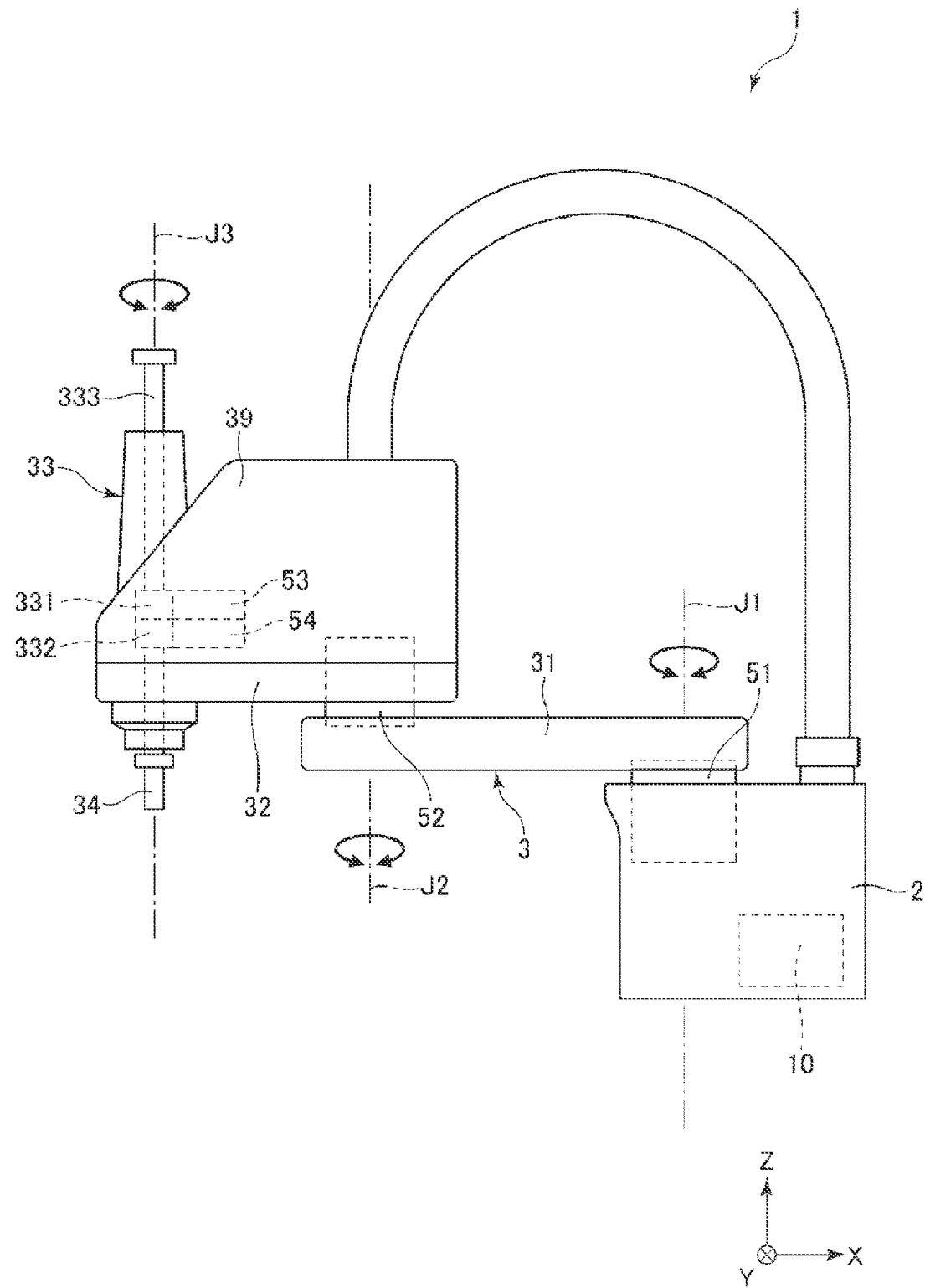
FIG. 1 is a side view showing a robot according to a preferred embodiment of the present disclosure.
Figure 2:
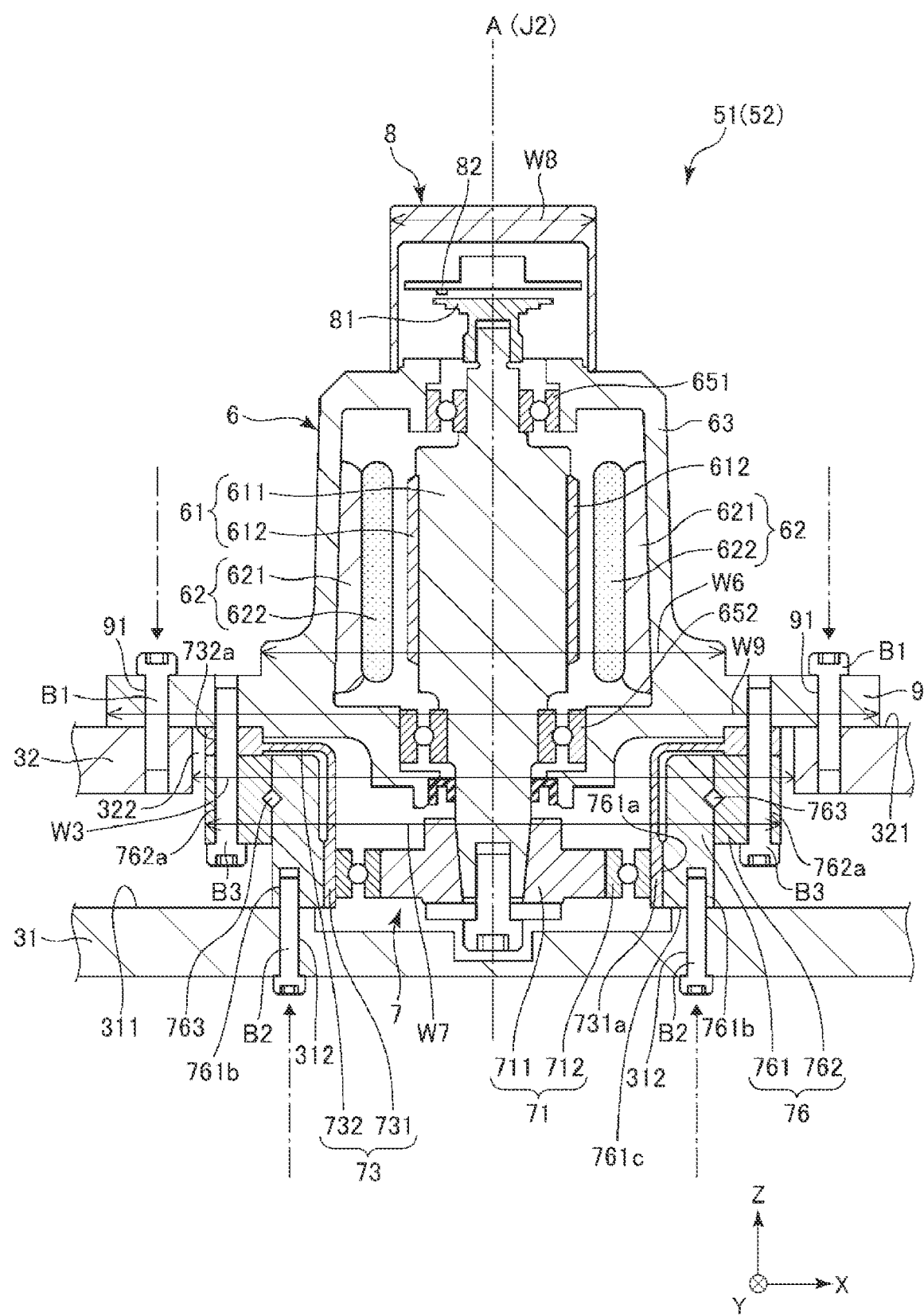
FIG. 2 is a sectional view showing a joint actuator coupling a first arm and a second arm.
Figure 8:
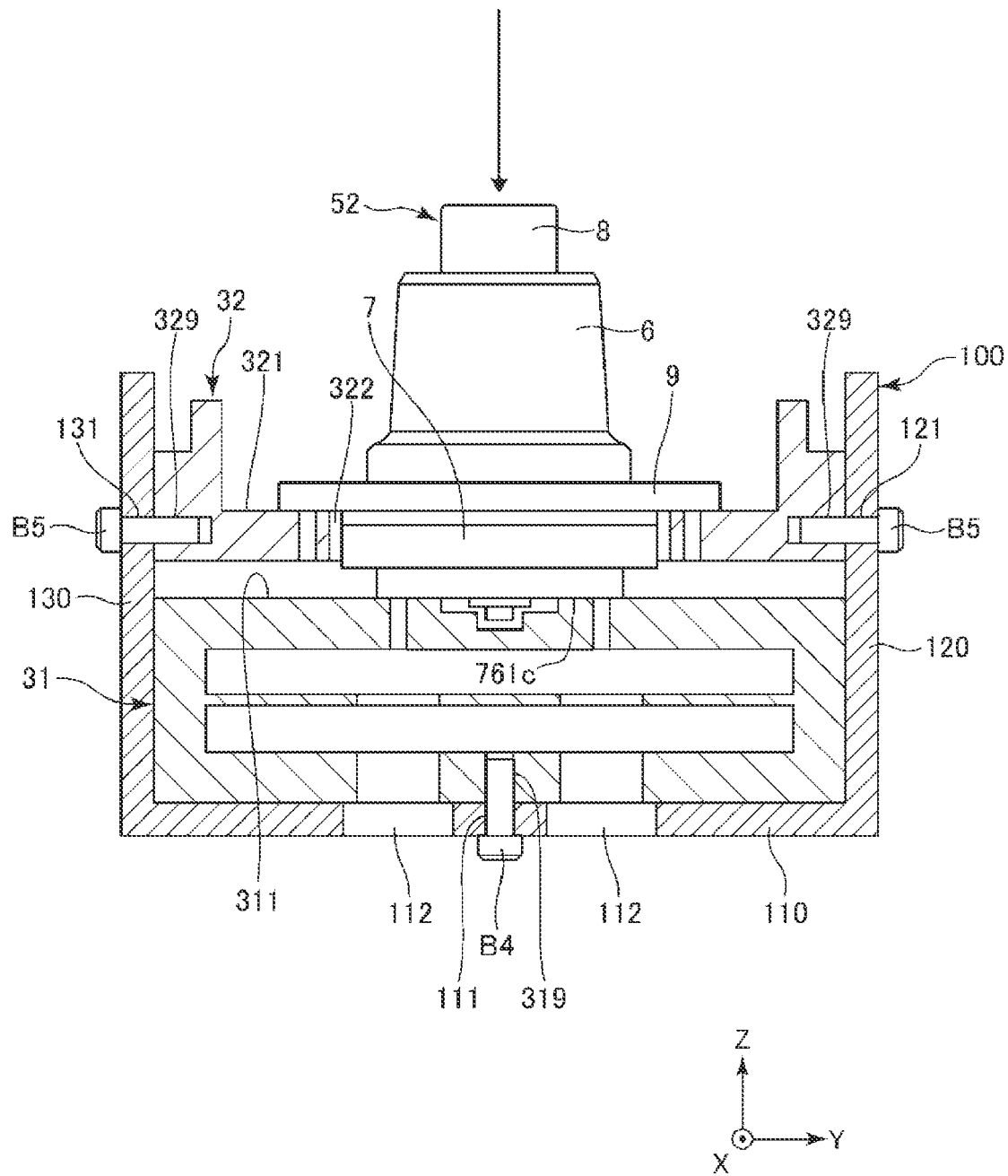
FIG. 8 is a sectional view for explanation of an attachment method for the joint actuator shown in FIG. 2.
Figure 9:
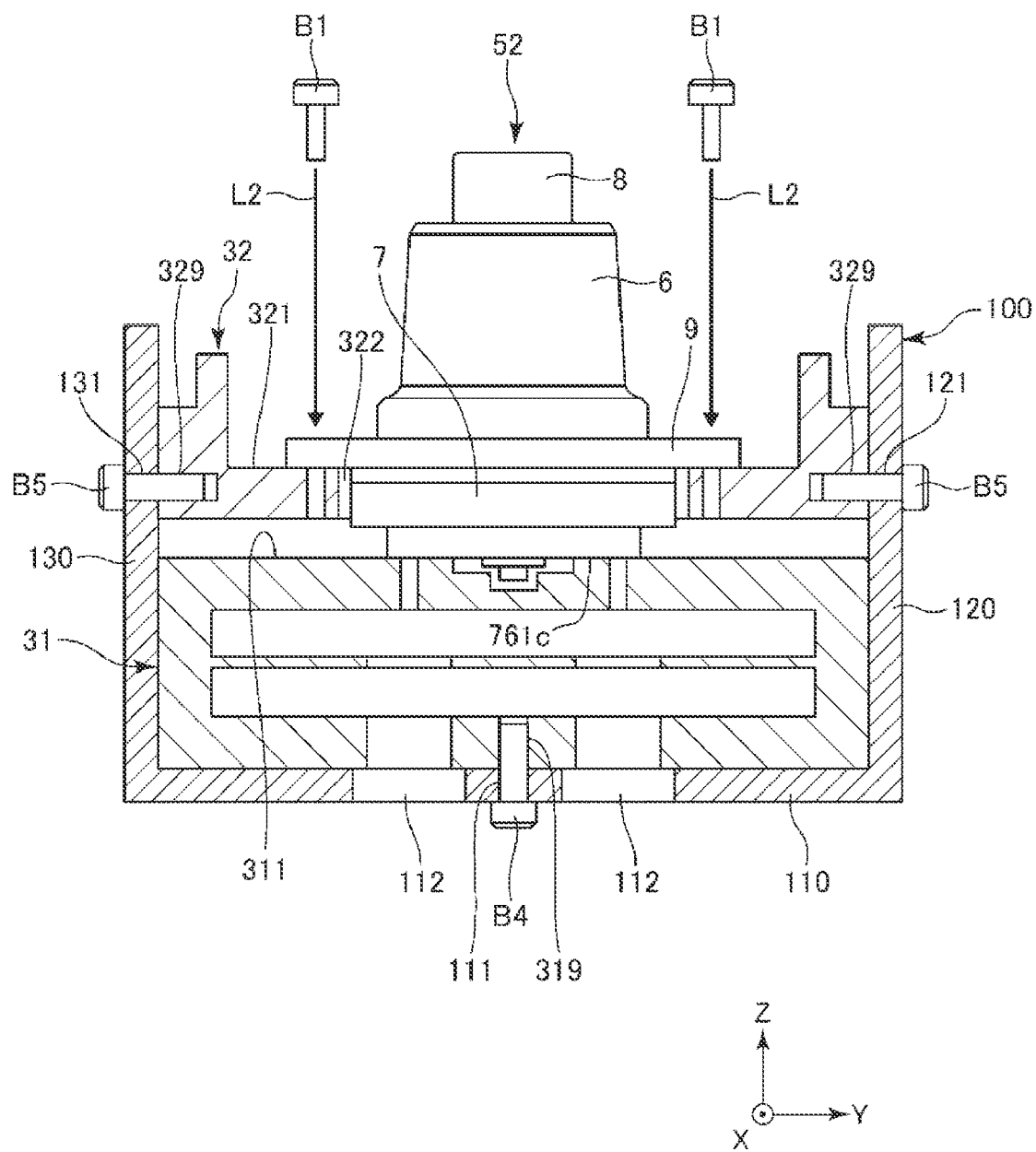
FIG. 9 is a sectional view for explanation of the attachment method for the joint actuator shown in FIG. 2.
Figure 10:
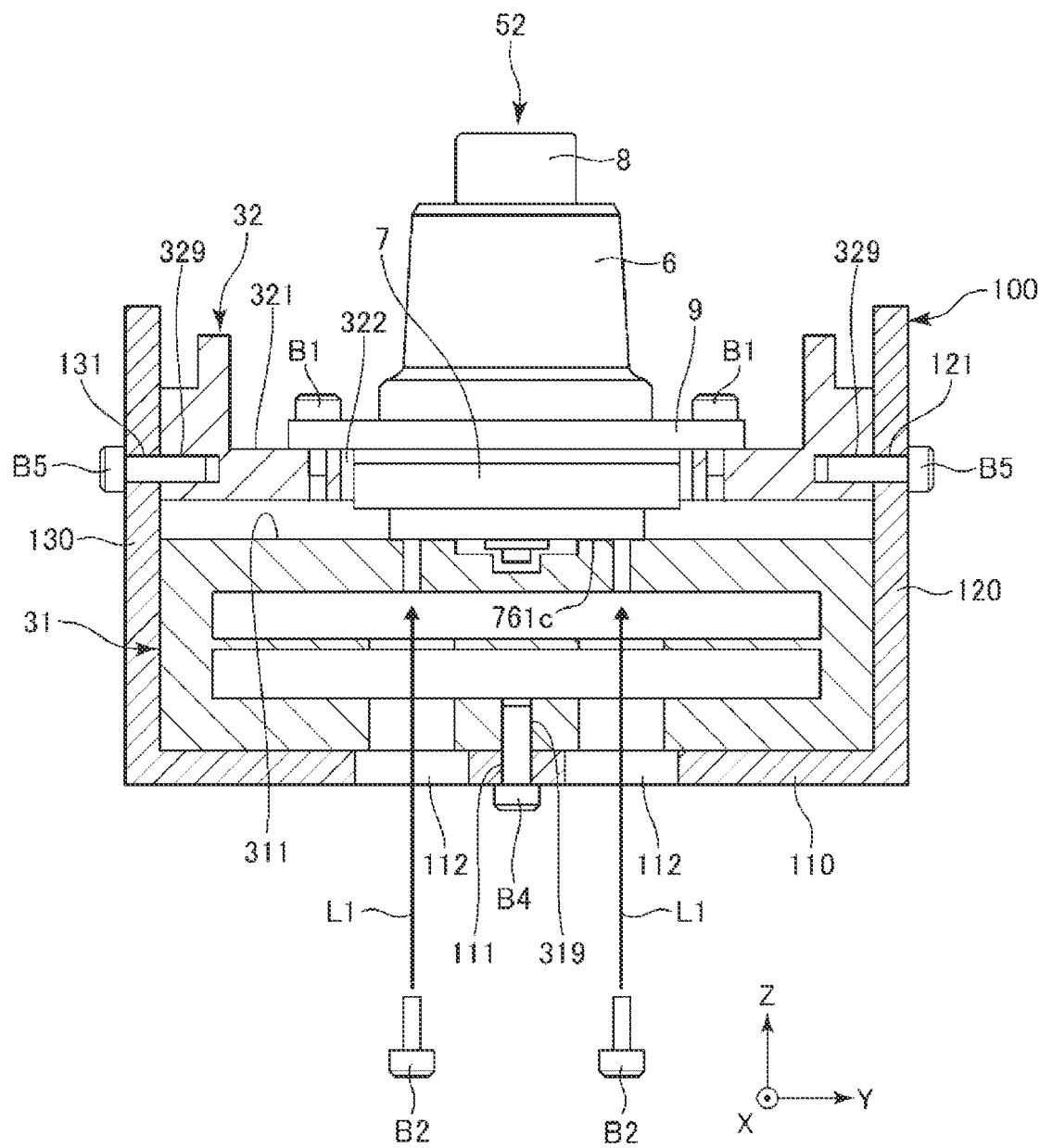
FIG. 10 is a sectional view for explanation of the attachment method for the joint actuator shown in FIG. 2.
Figure 11:
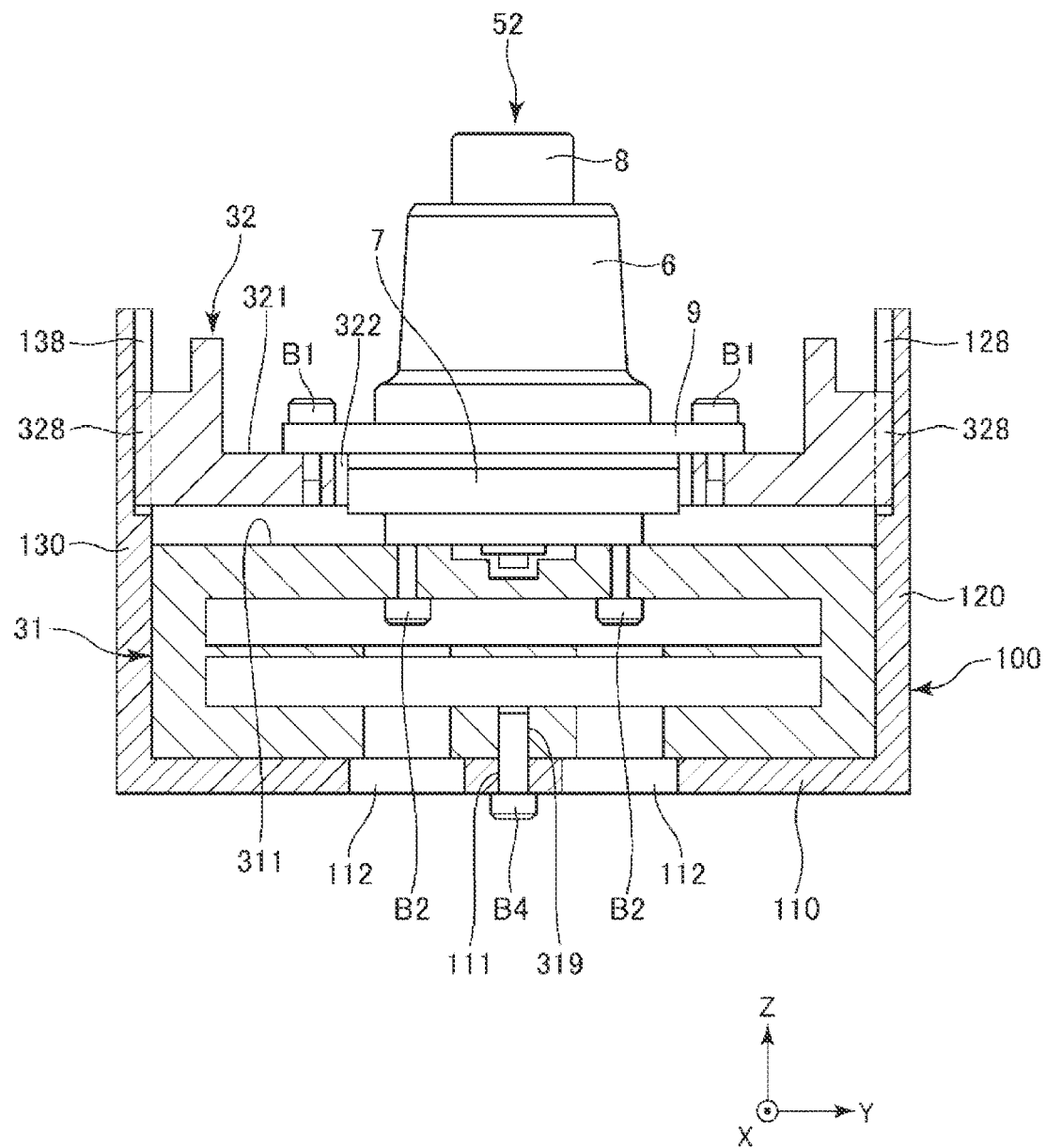
FIG. 11 is a sectional view showing a modified example of a fixing member fixing the first arm and the second arm.
Figure 12:
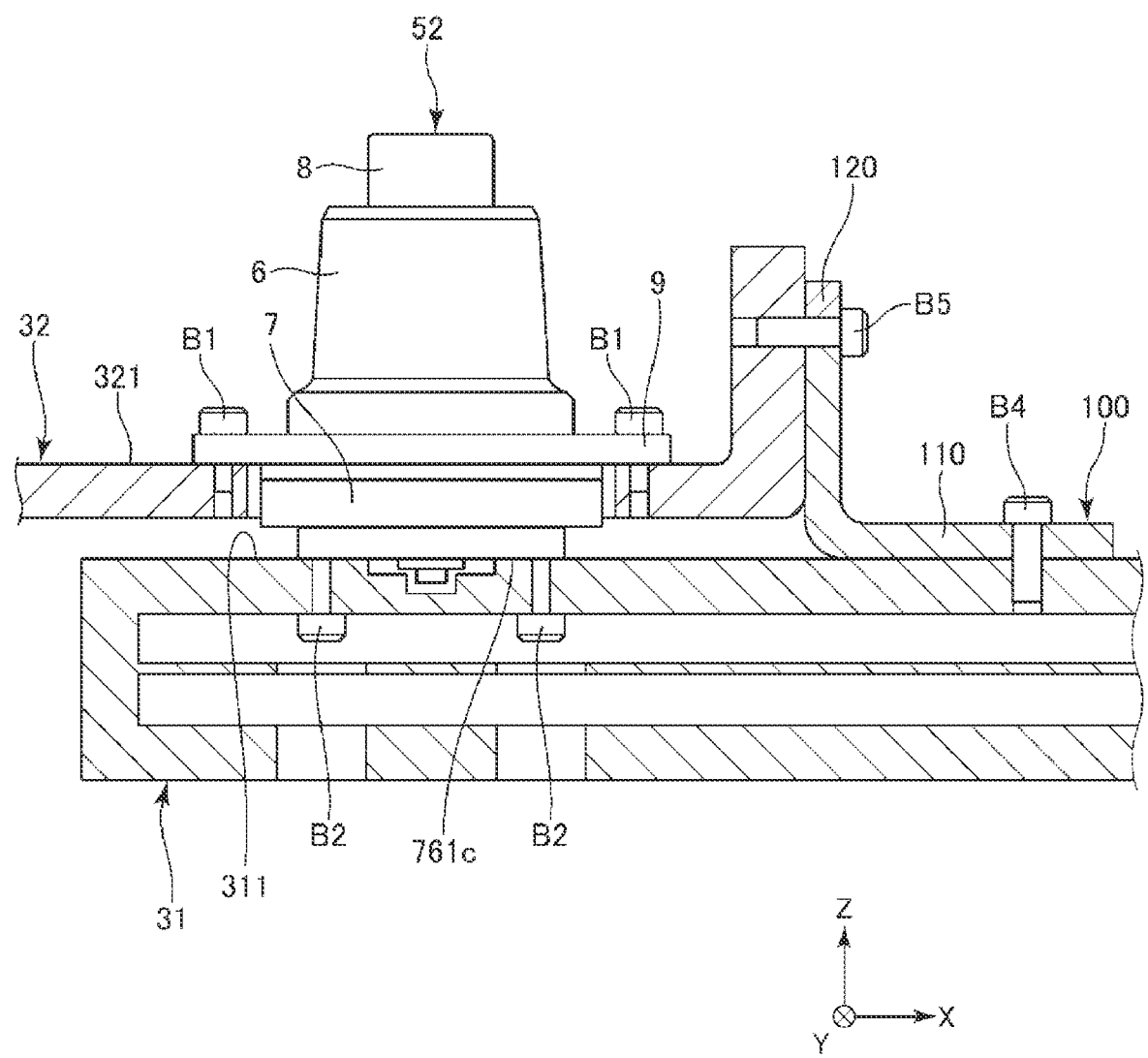
FIG. 12 is a sectional view showing a modified example of the fixing member fixing the first arm and the second arm.
Figure 13:
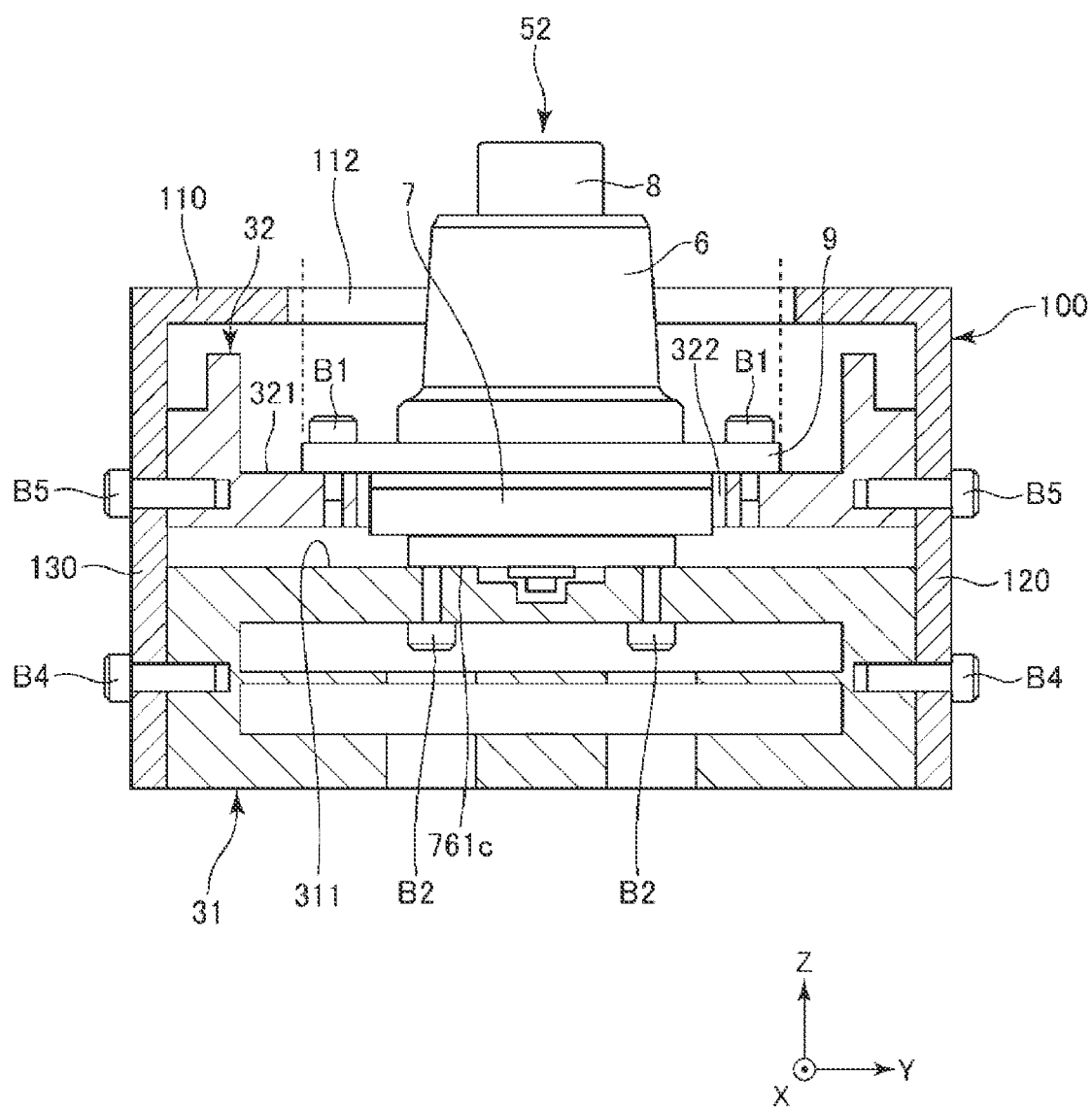
FIG. 13 is a sectional view showing a modified example of the fixing member fixing the first arm and the second arm.
Figure 14:
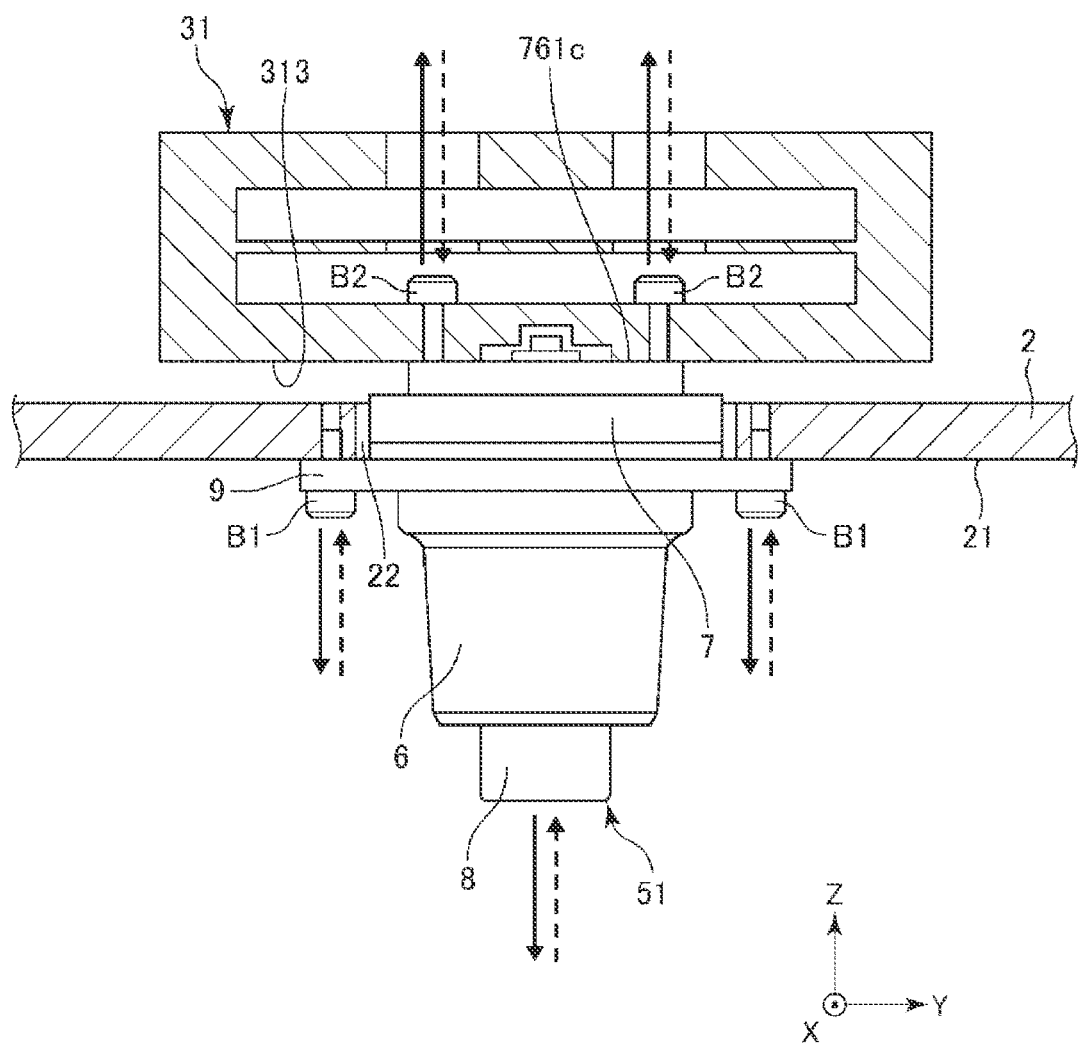
FIG. 14 is a sectional view showing a joint actuator coupling a base and the first arm.
Figure 15:
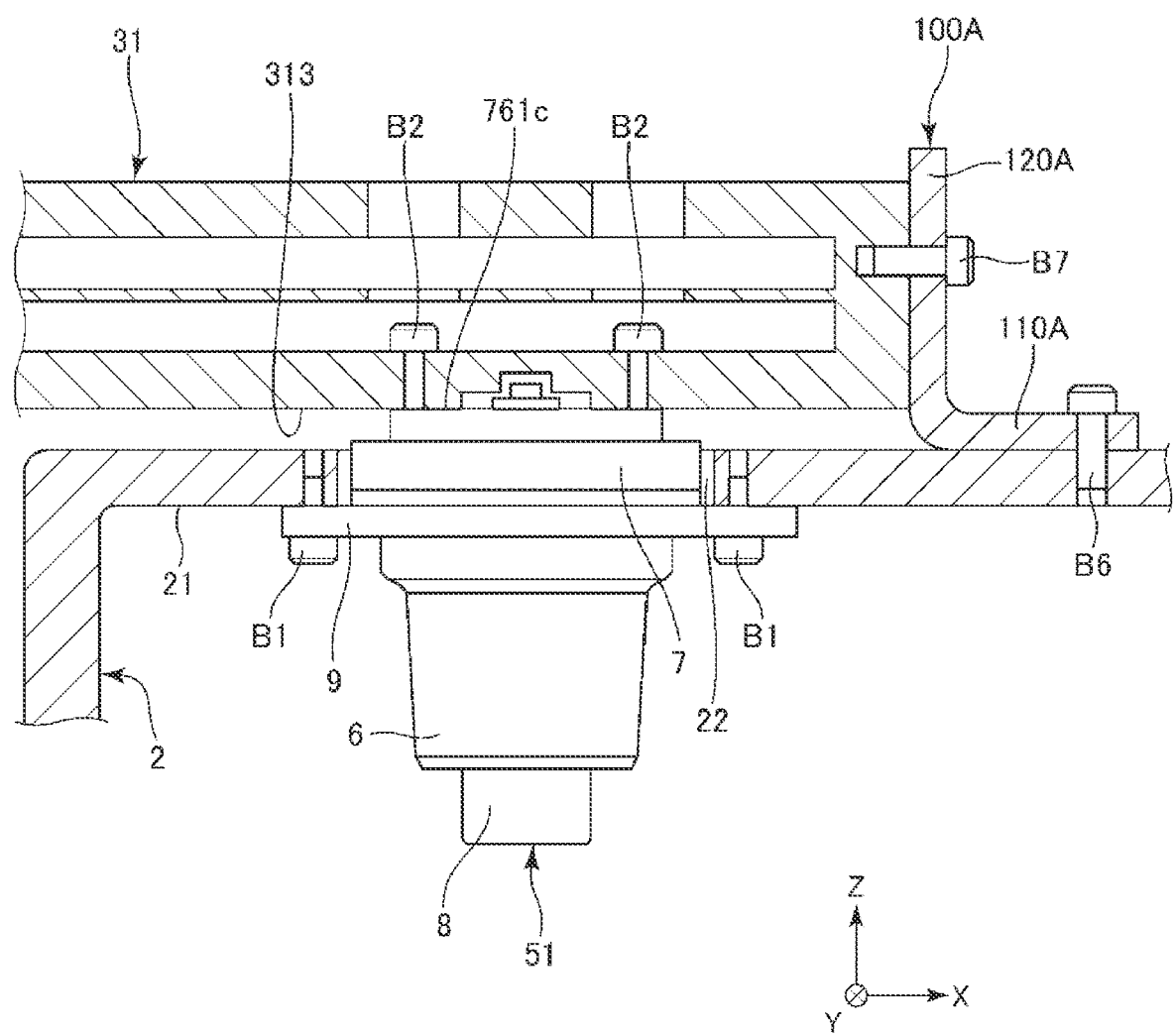
FIG. 15 is a sectional view showing a fixing member fixing the base and the first arm.
Figure 16:
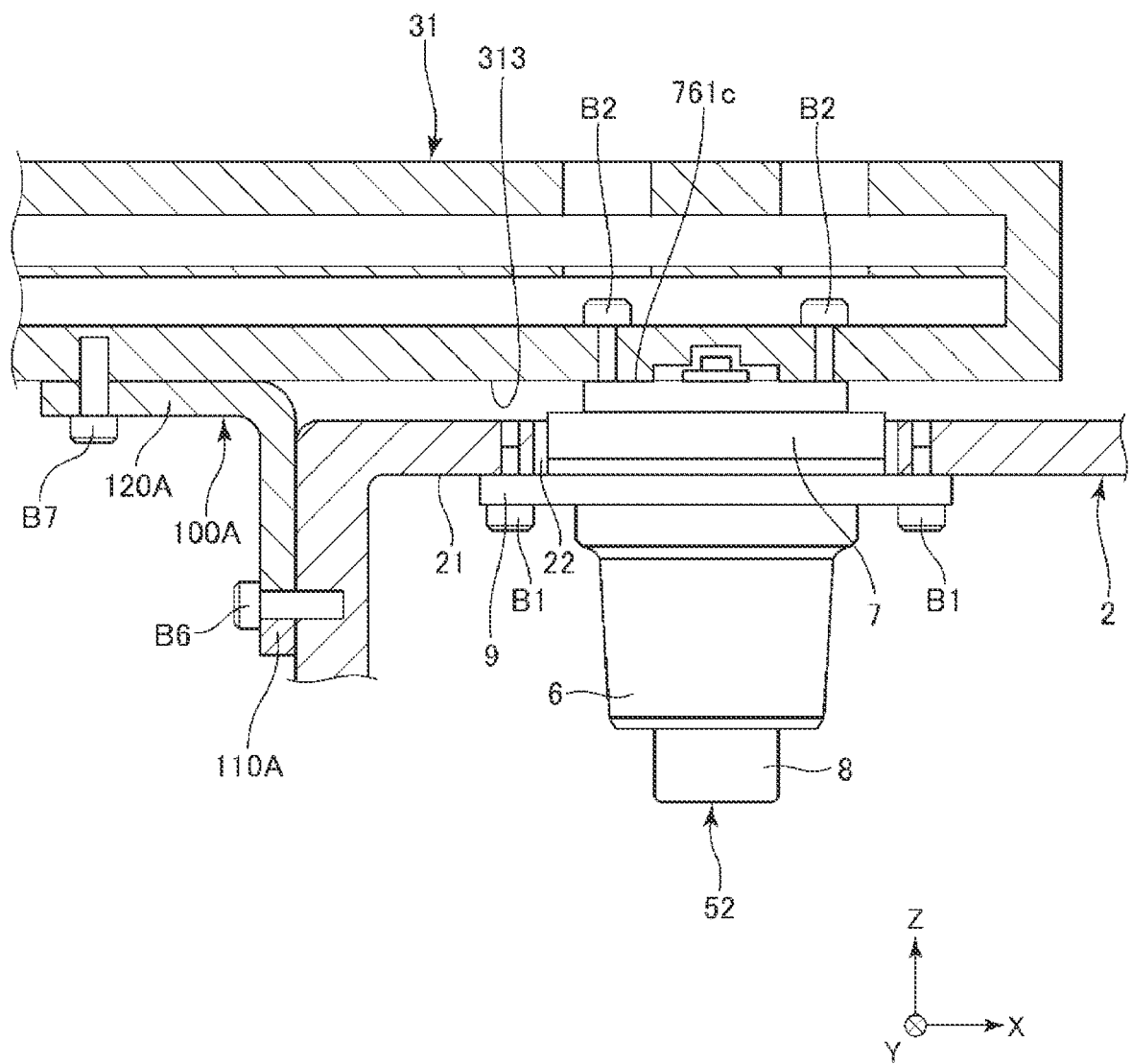
FIG. 16 is a sectional view showing a modified example of the fixing member fixing the base and the first arm.

FIG. 1 is a side view showing a robot according to a preferred embodiment of the present disclosure. FIG. 2 is a sectional view showing a joint actuator coupling a first arm and a second arm. FIGS. 3 to 7 are sectional views for explanation of a detachment method for the joint actuator shown in FIG. 2. FIGS. 8 to 10 are sectional views for explanation of an attachment method for the joint actuator shown in FIG. 2. FIGS. 11 to 13 are sectional views showing modified examples of a fixing member fixing the first arm and the second arm. FIG. 14 is a sectional view showing a joint actuator coupling a base and the first arm. FIG. 15 is a sectional view showing a fixing member fixing the base and the first arm. FIG. 16 is a sectional view showing a modified example of the fixing member fixing the base and the first arm.

For convenience of explanation, in the respective drawings, an X-axis, a Y-axis, and a Z-axis as three axes orthogonal to one another are shown. Further, in the following description, the upsides, i.e., the arrow-head sides of the Z axes in the drawings are "upward" in the vertical direction, and the downsides, i.e., the opposite sides to the arrow-heads of the Z axes in the drawings are referred to as "downward" in the vertical direction.

A robot 1 shown in FIG. 1 is a scalar robot and used in individual work of e.g. holding, transport, assembly, inspection, etc. of workpieces such as electronic components. Note that the application of the robot 1 is not particularly limited.

The robot 1 has a base 2 fixed to a floor surface and an arm 3 coupled to the base 2. Further, the arm 3 has a first arm 31 having a proximal end portion coupled to the base 2 and pivoting around a first pivot axis J1 along the vertical direction relative to the base 2, and a second arm 32 having a proximal end portion coupled to a distal end portion of the first arm 31 and pivoting around a second pivot axis J2 along the vertical direction relative to the first arm 31. The first pivot axis J1 and the second pivot axis J2 are parallel.

A working head 33 is provided in the distal end portion of the second arm 32. The working head 33 has a spline nut 331 and a ball screw nut 332 coaxially placed in the distal end portion of the second arm 32, and a spline shaft 333 inserted through the spline nut 331 and the ball screw nut 332. The spline shaft 333 is rotatable around a third pivot axis J3 as a center axis thereof along the vertical direction relative to the second arm 32 and movable upward and downward along the third pivot axis J3. The third pivot axis J3 is parallel to the first pivot axis J1 and the second pivot axis J2.

An end effector 34 is attached to the lower end portion of the spline shaft 333. The end effector 34 is detachable and one suitable for intended work is appropriately selected. The end effector 34 includes e.g. a hand holding a workpiece by nipping or suction and a work tool for performing predetermined processing on a workpiece.

The robot 1 has a joint actuator 51 coupling the base 2 and the first arm 31 and pivoting the first arm 31 around the first pivot axis J1 relative to the base 2, and a joint actuator 52 coupling the first arm 31 and the second arm 32 and pivoting the second arm 32 around the second pivot axis J2 relative to the first arm 31. Further, the robot 1 has a driver 53 rotating the spline nut 331 and rotating the spline shaft 333 around the third pivot axis J3, and a driver 54 rotating the ball screw nut 332 and moving the spline shaft 333 upward and downward in directions along the third pivot axis J3.

The robot 1 has a cover member 39 detachably attached to the second arm 32 and covering and protecting the individual units placed in the second arm 32, particularly, the joint actuator 52 and the drivers 53, 54.

The robot 1 has a robot control apparatus 10 placed within the base 2 and controlling driving of the joint actuators 51, 52 and the drivers 53, 54 according to a command from a host computer (not shown). The robot control apparatus 10 independently controls the joint actuators 51, 52 and the drivers 53, 54, and thereby, may control the robot 1 to perform desired work. The robot control apparatus 10 has e.g. a processor including a computer and processing information, a memory communicably connected to the processor, and an external interface. Various programs that can be executed by the processor are stored in the memory, and the processor may read and execute various programs etc. stored in the memory.

As above, the overall configuration of the robot 1 is briefly explained. Next, the joint actuators 51, 52 will be described in detail. Note that the joint actuators 51, 52 are placed in different positions, but have the same configuration as each other. As below, the joint actuator 52 will be explained in detail and the joint actuator 51 will be briefly explained mainly regarding only the difference from the joint actuator 52.

As shown in FIG. 2, the joint actuator 52 has a flange 9 fixed to a second mounting surface 321 of the second arm 32, a motor 6 as a drive source placed to project upward from the flange 9, an encoder 8 as a rotation detector placed on the upside of the motor 6, and a wave gearing 7 as a reducer projecting downward from the flange 9 and fixed to a first mounting surface 311 of the first arm 31. Note that the first mounting surface 311 and the second mounting surface 321 each face upward.

A width W6 of the motor 6 and a width W7 of the wave gearing 7 are each smaller than a width W9 of the flange 9. That is, W6<W9 and W7<W9. A width W8 of the encoder 8 is smaller than the width W6 of the motor 6. That is, W8<W6. Accordingly, as seen from the upside in the vertical direction, the flange 9 is visually recognized to project from around the encoder 8 and the motor 6 and, as seen from the downside in the vertical direction, the flange 9 is visually recognized to project from around the wave gearing 7. Note that, in the embodiment, the flange 9, the motor 6, and the wave gearing 7 each have a circular shape in the plan view from the vertical direction, and the "width" is synonymous with "diameter".

The motor 6 is an AC servo motor. The motor 6 is not particularly limited, but e.g. a DC servo motor, a stepping motor, or the like may be used.

The motor 6 has a rotor 61, a stator 62, and a housing 63 housing the rotor and the stator.

The rotor 61 has a shaft 611 as a rotation axis and a magnet 612. The shaft 611 is supported by the housing 63 rotatably around a center axis A thereof via a pair of bearings 651, 652. The center axis A coincides with the second pivot axis J2. Further, the shaft 611 is coupled to the wave gearing 7 in the lower end portion of the shaft and coupled to the encoder 8 in the upper end portion of the shaft. Thereby, the rotation of the shaft 611 is transmitted to the wave gearing 7 and the encoder 8.

The stator 62 is placed to surround the rotor 61 around the center axis A. The stator 62 has cores 621 placed at predetermined intervals in the circumferential direction and coils 622 wound around the respective cores 621. When an alternating current flows in the stator 62, the stator 62 serves as an electromagnet and the N-pole and the S-pole are alternatively switched. Accordingly, the magnet 612 of the rotor 61 is attracted and repulsed, and thereby, the shaft 611 rotates around the center axis A.

The flange 9 is integrally formed with the housing 63 and has a disc shape projecting outward in the radial direction of the center axis A from the housing 63. Note that the flange 9 may be separately formed from the housing 63. The flange 9 has a plurality of insertion holes 91 placed at equal intervals along the circumferential direction. Further, the flange 9 is fixed to the second arm 32 by first screws B1 inserted through the insertion holes 91. Thereby, the motor 6 is fixed to the second arm 32 via the flange 9. Specifically, an opening 322 penetrating in the vertical directions of the second arm 32 is formed in a position facing the distal end portion of the first arm 31 in the proximal end portion of the second arm 32. A width W3 of the opening 322 is smaller than the width W9 of the flange 9 and larger than the width W7 of the wave gearing 7. That is, W7<W3<W9. The joint actuator 52 is mounted on the second mounting surface 321 of the second arm 32 to block the opening 322 from the upside, and the flange 9 is fastened to the second arm 32 by the first screws B1 inserted through the insertion holes 91 from the upside.

The wave gearing 7 is placed adjoiningly to the motor 6 along the center axis A on the downside, i.e., the first arm 31 side of the motor 6. The wave gearing 7 reduces and outputs the rotation of the shaft 611 at a higher reduction ratio and generates higher torque in proportion to the reduction ratio. The wave gearing 7 has a wave generator 71, a flexspline 73, and a circular spline 76. As will be described later, in the wave gearing 7, the wave generator 71 is at an input side to which power of the motor 6 is input and the circular spline 76 is at an output side from which the power of the motor 6 is reduced and output.

The circular spline 76 is an annular internal gear formed by a rigid body that is substantially inflexible. The circular spline 76 has a coupling portion 761 fixed to the first arm 31 and a fixed portion 762 fixed to the flange 9. The coupling portion 761 and the fixed portion 762 are coupled by a bearing 763 and the coupling portion 761 is rotatable relative to the fixed portion 762.

Internal teeth 761a meshing with the flexspline 73 are formed in the inner circumferential part of the coupling portion 761. The coupling portion 761 has fixing screw holes 761b opening to a lower surface 761c for fixing the coupling portion 761 to the first arm 31. The coupling portion 761 is fixed to the first arm 31 by second screws B2 screwed into the fixing screw holes 761b. Specifically, when the flange 9 is fastened to the second arm 32 by the screws, the wave gearing 7 projects downward from the second arm 32 via the opening 322 and the lower surface 761c of the coupling portion 761 contacts the first mounting surface 311 of the first arm 31. In the first arm 31, insertion holes 312 for insertion of the second screws B2 are formed in positions corresponding to the fixing screw holes 761b. The second screws B2 inserted through the insertion holes 312 from the downside of the first arm 31 are screwed into the fixing screw holes 761b, and the coupling portion 761 is fastened to the first arm 31 by the screws. Thereby, the coupling portion 761 as the output portion of the wave gearing 7 is fixed to the first arm 31.

On the other hand, the fixed portion 762 has insertion holes 762a for fixing the fixed portion 762 to the flange 9, and fixed to the flange 9 by third screws B3 inserted through the insertion holes 762a.

The flexspline 73 is placed inside of the circular spline 76. The flexspline 73 has a tubular portion 731 having flexibility to be flexurally deformable along the outer circumference of the wave generator 71, and a flange portion 732 extending outward in the radial direction of the center axis A from the lower end part of the tubular portion 731.

External teeth 731a meshing with the internal teeth 761a of the circular spline 76 are formed in the outer circumferential part of the tubular portion 731. The number of teeth of the external teeth 731a is set to be smaller than the number of teeth of the internal teeth 761a. The flange portion 732 is provided between the circular spline 76 and the flange 9. The flange portion 732 has insertion holes 732a for fixing the flange portion 732 to the flange 9, and is fixed to the flange 9 with the fixed portion 762 by the third screws B3 inserted through the insertion holes 732a.

The wave generator 71 has a wave generation portion 711 rotating with the rotation of the shaft 611 with the shaft 611 inserted in the wave generation portion, and a bearing 712 fitted between the wave generation portion 711 and the flexspline 73. The wave generation portion 711 has an outer circumference in an elliptical shape or an oval shape in the plan view from the center axis A direction. The wave generator 71 contacts the inner circumferential surface of the tubular portion 731 of the flexspline 73, flexes the tubular portion 731 into an elliptical shape or an oval shape, and partially meshes the external teeth 731a of the tubular portion 731 with the internal teeth 761a of the circular spline 76. Thereby, the circular spline 76 meshes with the teeth in the long axis part and completely separates from the teeth in the short axis part.

When drive power from the motor 6 is input to the wave generator 71, the flexspline 73 and the circular spline 76 relatively rotate around the center axis A due to the difference in number of teeth while the mesh position with each other sequentially moves in the circumferential direction. In the embodiment, the flange portion 732 of the flexspline 73 and the fixed portion 762 of the circular spline 76 are fixed to the second arm 32 via the flange 9 and the coupling portion 761 of the circular spline 76 is fixed to the first arm 31, and thereby, the second arm 32 pivots around the second pivot axis J2 relative to the first arm 31. According to the wave gearing 7, the rotation input from the motor 6 to the wave generator 71 is reduced and output from the coupling portion 761 of the circular spline 76, and torque proportional to the reduction ratio may be obtained at the output side.

The encoder 8 is placed adjoiningly to the motor 6 along the center axis A and located on the upside of the motor 6. The encoder 8 has an optical scale 81 fixed to the shaft 611 and an optical sensor 82 detecting the rotation state of the optical scale 81. The optical scale 81 rotates around the center axis A with the shaft 611. On the upper surface of the optical scale 81, a detection pattern (not shown) by which the rotation angle of the optical scale 81 may be obtained is formed. On the other hand, the optical sensor 82 has a light emitting device that outputs light toward the detection pattern on the optical scale 81 and a light receiving device that receives the light reflected by the detection pattern. In the encoder 8 having the above described configuration, the waveform of the output signal from the light receiving device changes with the rotation of the optical scale 81 around the center axis A. Accordingly, the rotation angle of the optical scale 81 may be detected based on the output signal.

Figure 3:
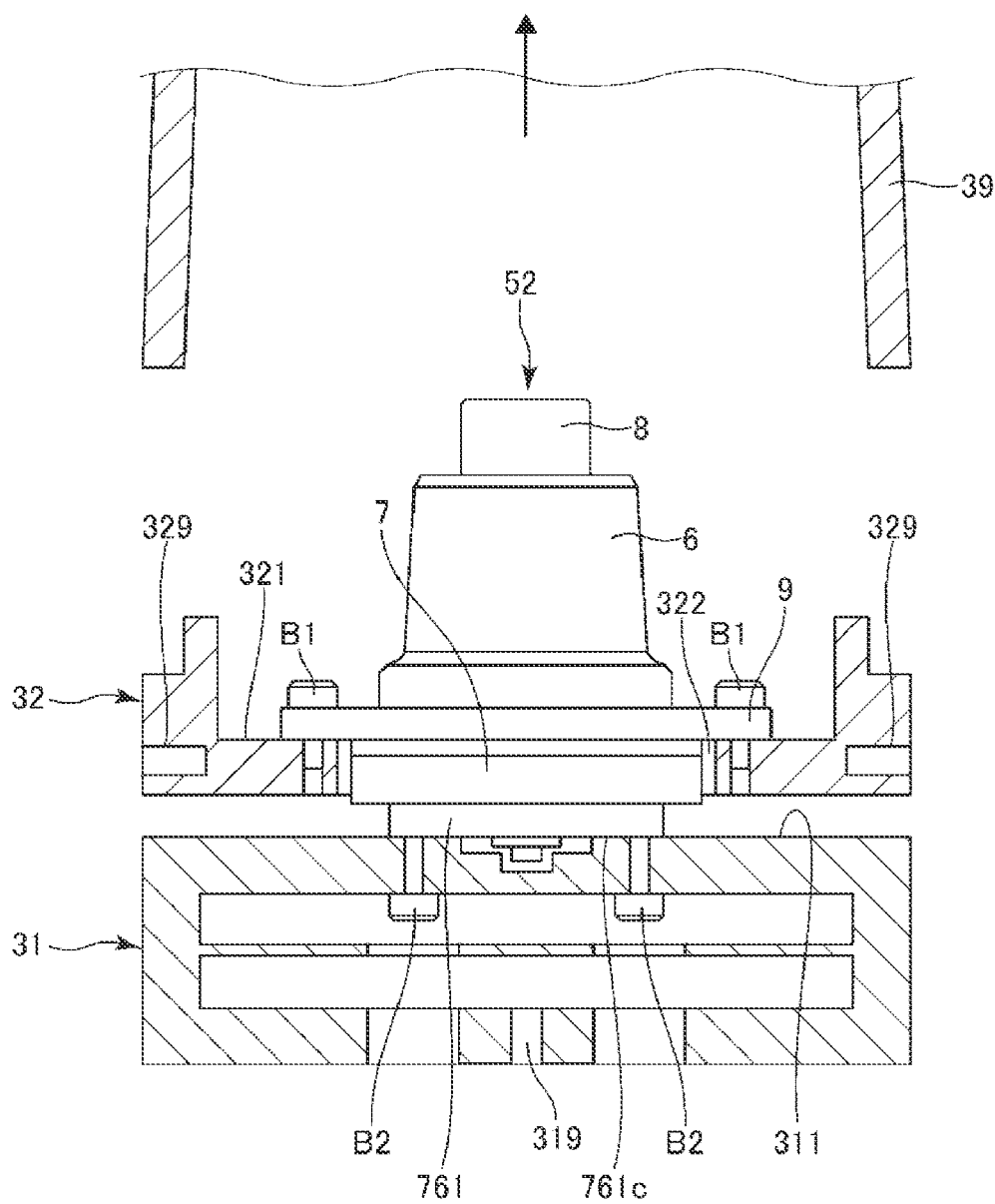
FIG. 3 is a sectional view for explanation of a detachment method for the joint actuator shown in FIG. 2.
Figure 4:
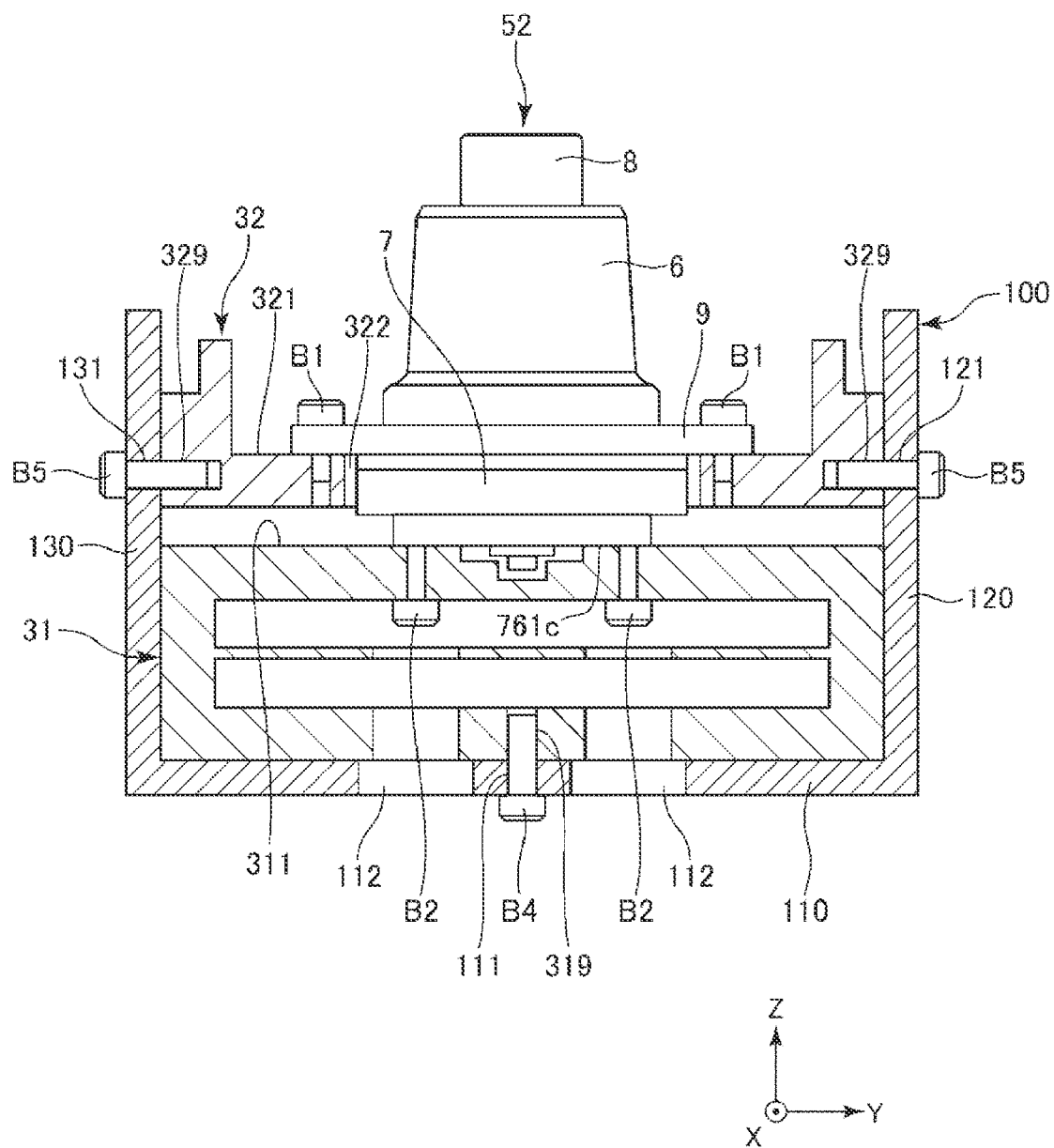
FIG. 4 is a sectional view for explanation of the detachment method for the joint actuator shown in FIG. 2.

As above, the configuration of the joint actuator 52 is explained. Next, a method of detaching the joint actuator 52 from the robot 1 for replacement and maintenance will be explained. First, as shown in FIG. 3, the cover member 39 is detached from the second arm 32 and the joint actuator 52 is exposed. Then, as shown in FIG. 4, a fixing member 100 is fixed to the first arm 31 and the second arm 32 to couple the first arm 31 and the second arm 32, and thereby, the relative position of these arms is fixed. Note that the fixing member 100 will be described later in detail.

Figure 5:
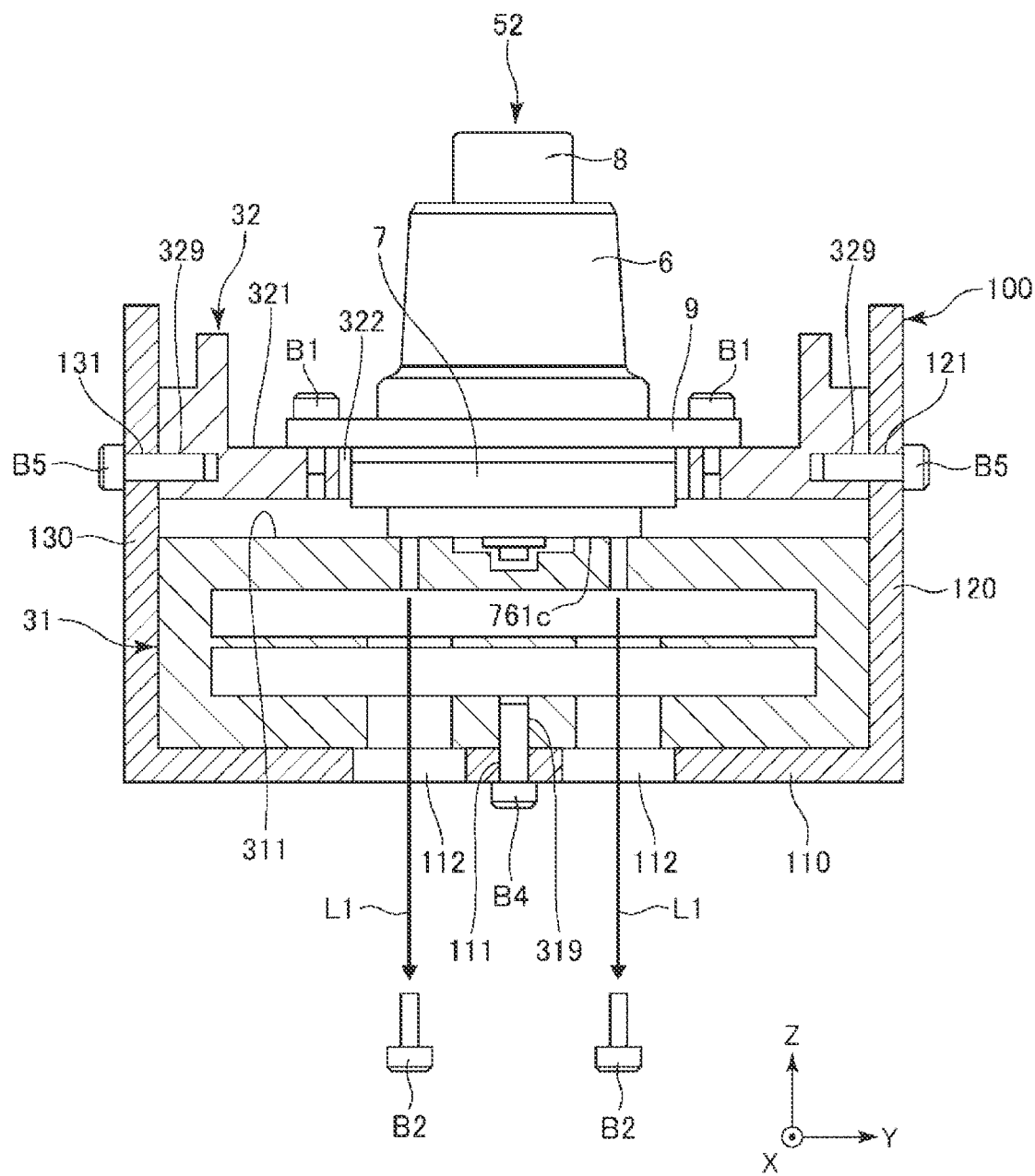
FIG. 5 is a sectional view for explanation of the detachment method for the joint actuator shown in FIG. 2.

Then, as shown in FIG. 5, the second screws B2 fixing the coupling portion 761 to the first arm 31 are approached from the downside of the first arm 31 and the second screws B2 are detached. Thereby, the joint actuator 52 is separated from the first arm 31. Note that no member impossible or difficult to be detached is placed at the downside of the second screws B2 and work paths L1 for approaching the second screws B2 from the downside are secured in the first arm 31. In other words, when the first arm 31 is seen from the downside, the second screws B2 are seen. Thereby, the second screws B2 may be smoothly detached.

Figure 6:
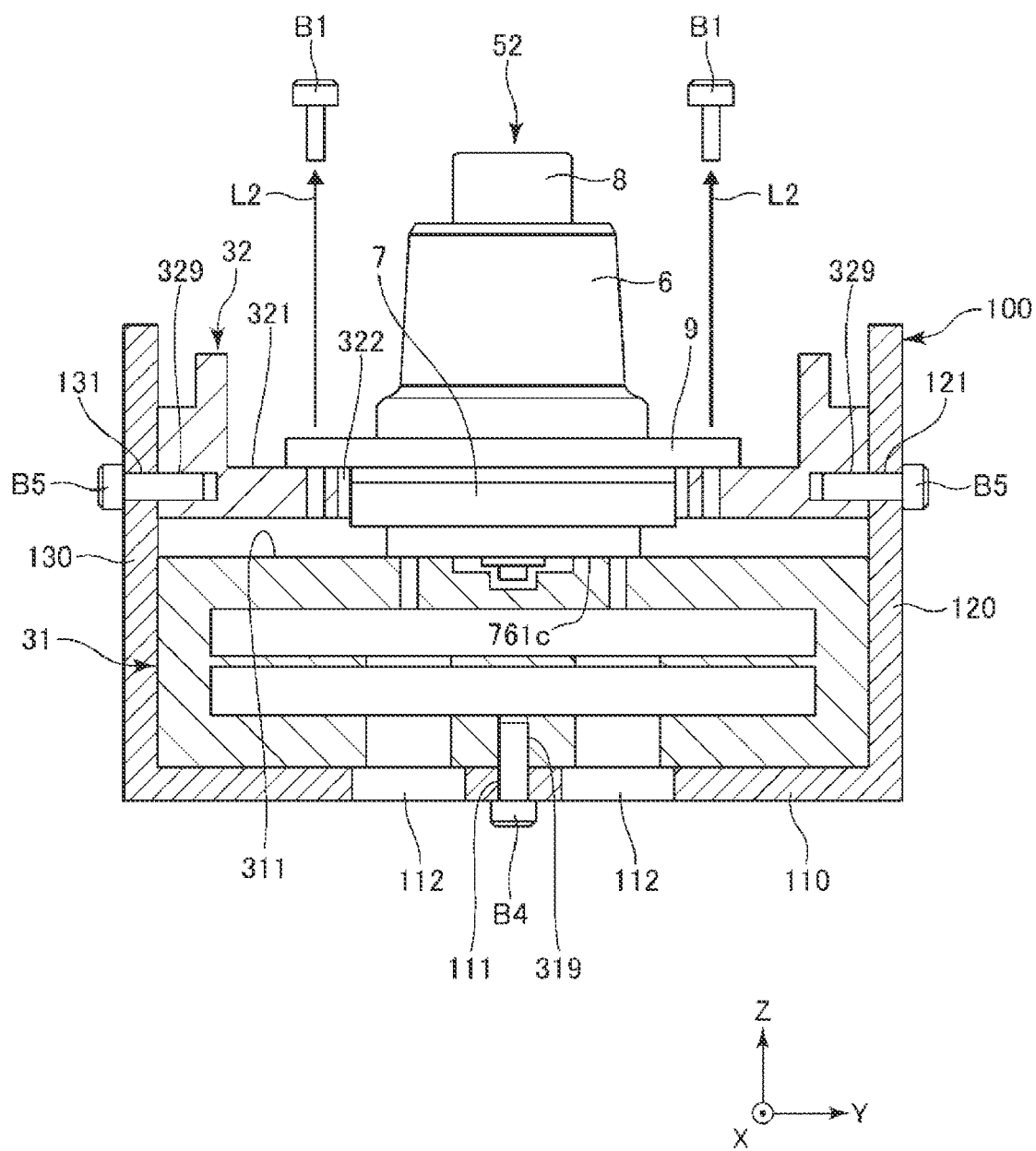
FIG. 6 is a sectional view for explanation of the detachment method for the joint actuator shown in FIG. 2.

Then, as shown in FIG. 6, the first screws B1 fixing the flange 9 to the second arm 32 are approached from the upside of the second arm 32 and the first screws B1 are detached. Thereby, the joint actuator 52 is separated from the second arm 32. Note that no member impossible or difficult to be detached is placed at the upside of the first screws B1 and work paths L2 for approaching the first screws B1 from the upside are secured in the second arm 32. In other words, when the second arm 32 is seen from the upside, the first screws B1 are seen. Thereby, the first screws B1 may be smoothly detached.

Figure 7:
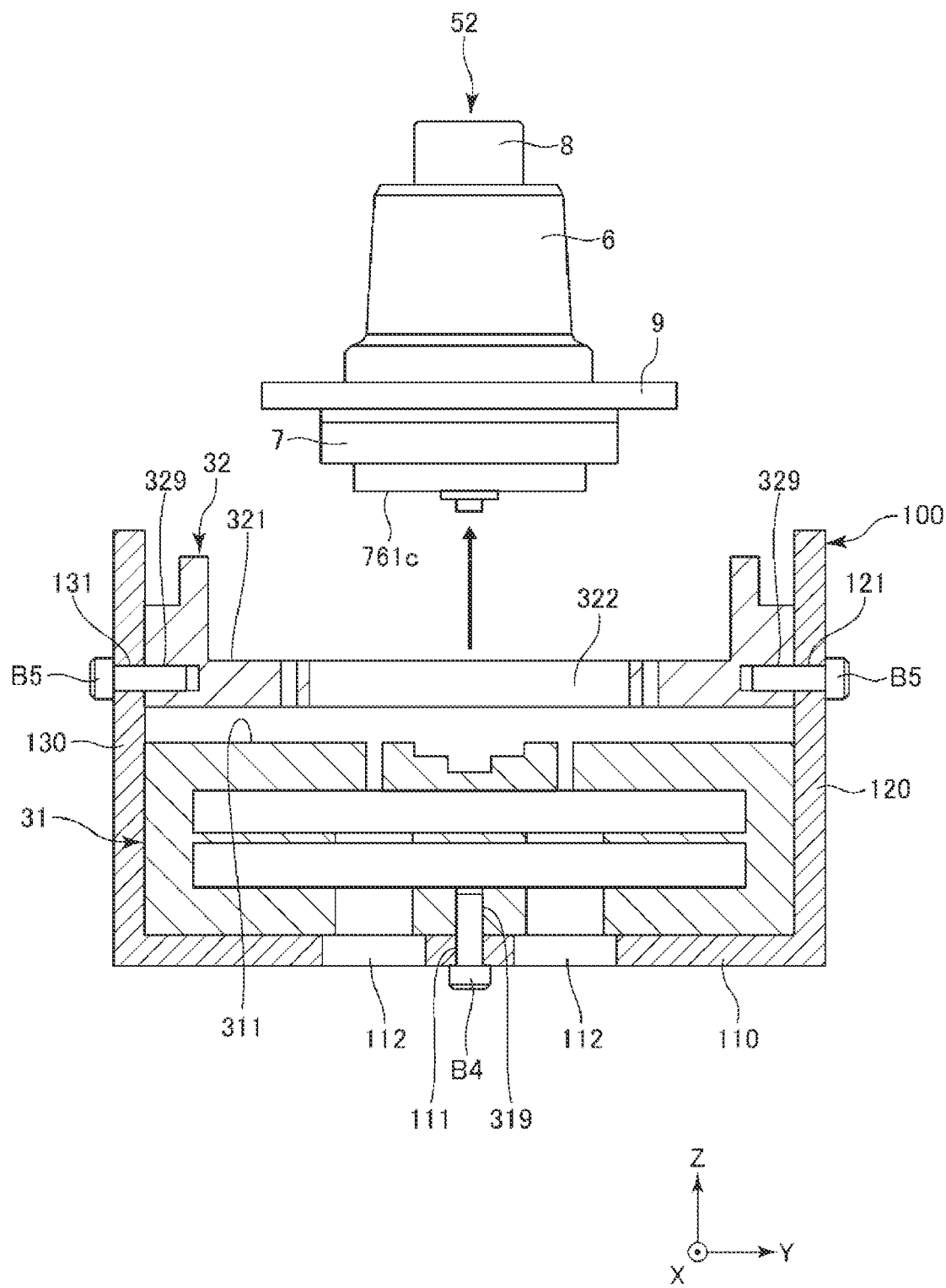
FIG. 7 is a sectional view for explanation of the detachment method for the joint actuator shown in FIG. 2.

Then, as shown in FIG. 7, the joint actuator 52 is pulled out upward and detached from the robot 1. Thereby, the detachment of the joint actuator 52 is completed. According to the above described steps, the joint actuator 52 may be easily detached from the robot 1. Particularly, unlike the related art, the motor 6 and the wave gearing 7 may be integrally detached at the same time, and extremely high work efficiency may be exerted. Note that the steps for detachment work are not limited to those. For example, in the above description, the second screws B2 are detached before the first screws B1, however, the first screws B1 may be detached before the second screws B2. Or, the first screws B1 and the second screws B2 may be detached at the same time or alternately detached.

The first arm 31 and the second arm 32 are fixed by the fixing member 100, and thereby, detachment work of the joint actuator 52 may be smoothly performed. Further, even when the joint actuator 52 is detached from the robot 1, the relative position of the first arm 31 and the second arm 32 may be maintained.

Next, a method of attaching the joint actuator 52 will be explained after FIG. 7. Note that the attachment method for the joint actuator 52 has a reverse procedure to the above described detachment method and will be briefly explained. First, as shown in FIG. 8, the joint actuator 52 is entered from the upside of the second arm 32 and mounted on the second mounting surface 321 to block the opening 322. Thereby, the wave gearing 7 projects downward via the opening 322 and the lower surface 761c of the coupling portion 761 contacts the first mounting surface 311 of the first arm 31.

Then, as shown in FIG. 9, the flange 9 is approached from the upside and the flange 9 is fixed to the second arm 32 using the first screws B1. The work paths L2 are secured, and the first screws B1 may be smoothly attached. Then, as shown in FIG. 10, the lower surface 761c of the coupling portion 761 is approached from the downside of the first arm 31, and the coupling portion 761 is fixed to the first arm 31 using the second screws B2. The work paths L1 are secured, and the second screws B2 may be smoothly attached. Then, the fixing member 100 is detached from the robot 1, and the cover member 39 is attached to the second arm 32. Thereby, the attachment of the joint actuator 52 is completed.

According to the above described steps, the joint actuator 52 may be easily attached to the robot 1. Particularly, unlike the related art, the motor 6 and the wave gearing 7 may be integrally attached at the same time, and extremely high work efficiency may be exerted. The first arm 31 and the second arm 32 are fixed by the fixing member 100, and thereby, attachment work of the joint actuator 52 may be smoothly performed. Particularly, the relative position of the first arm 31 and the second arm 32 does not shift when the joint actuator 52 is attached and detached, and calibration of the encoder 8 after attachment of the joint actuator 52 is unnecessary. Therefore, efforts for replacement or maintenance may be reduced and operation of the robot 1 may be restarted earlier after attachment of the joint actuator 52.

Next, the fixing member 100 will be explained. As shown in FIG. 4, the fixing member 100 of the embodiment has a U-shape and includes a bottom portion 110 and a pair of wall portions 120, 130 stood from ends of the bottom portion 110. The fixing member 100 is attached from the downside, and the bottom portion 110 is fixed to the first arm 31 and the wall portions 120, 130 are fixed to the second arm 32. Thereby, the first arm 31 and the second arm 32 are fixed via the fixing member 100.

The bottom portion 110 has a first insertion hole 111. The bottom portion 110 is fastened to the first arm 31 by screwing of a fourth screw B4 inserted through the first insertion hole 111 from the downside into a fixing screw hole 319 formed in a position corresponding to the first insertion hole 111 of the first arm 31. On the other hand, the wall portions 120, 130 have second insertion holes 121, 131, respectively. The wall portions 120, 130 are fastened to the second arm 32 by screwing of fifth screws B5 inserted from sides through the second insertion holes 121, 131 into fixing screw holes 329 formed in positions corresponding to the second insertion holes 121, 131 of the second arm 32.

Thereby, the first arm 31 and the second arm 32 are fixed via the fixing member 100 and, even when the joint actuator 52 is detached from the robot 1, the relative position of the first arm 31 and the second arm 32 may be maintained.

The fixing member 100 has a shape not overlapping with the work paths L1 or the work paths L2. In other words, with the fixing member 100 attached to the robot 1, when the first arm 31 is seen from the downside, the second screws B2 are seen and, when the second arm 32 is seen from the upside, the first screws B1 are seen. Thereby, the work paths L1 and the work paths L2 are not blocked by the fixing member 100 and attachment and detachment of the first screws B1 and the second screws B2 are not hindered. In the embodiment, through holes 112 are formed in the parts overlapping with the work paths L1 to form the shape not overlapping with the work paths L1. Note that the through holes 112 of the embodiment are closed holes, however, may be formed as cutouts coupled to the outer edge of the bottom portion 110.

As above, the fixing member 100 is explained, however, the fixing member 100 is not particularly limited as long as the member may fix the first arm 31 and the second arm 32. For example, as shown in FIG. 11, the fixing member 100 may further have grooves as positioning portions 128, 138 formed to extend in the vertical directions in the inner surfaces of the wall portions 120, 130, respectively, and may be positioned with respect to the robot 1 by engagement of the grooves with projections 328 formed on the side surface of the second arm 32. Thereby, the attachment of the fixing member 100 to the robot 1 is easier. Or, for example, as shown in FIG. 12, the fixing member 100 may have an L-shape and may be fixed to the upper surface of the first arm 31 and the proximal end surface of the second arm 32. Or, as shown in FIG. 13, the fixing member 100 may be attached from the upside of the second arm 32 reversely to the embodiment, the wall portions 120, 130 and the first arm 31 may be fixed by the fourth screws B4, and the wall portions 120, 130 and the second arm 32 may be fixed by fifth screws B5.

The fixing member 100 fixes the first arm 31 and the second arm 32 in an attitude extending straight. In a general scalar robot, the attitude is a reference position, i.e., an attitude in which the pivot angle of the second arm 32 relative to the first arm 31 is 0°. Accordingly, with the first arm 31 and the second arm 32 fixed in the attitude, attachment and detachment of the joint actuator 52 are performed, and thereby, resetting or the like of the joint actuator 52 is easier.

Note that the attitude of the first arm 31 and the second arm 32 is not particularly limited. When it is difficult to set the first arm 31 and the second arm 32 to extend straight due to e.g. a problem of the work space or the like, an attitude in which the second arm 32 bends relative to the first arm 31 (an attitude at pivot angle≠0) may be set. In this attitude, the center of gravity of the robot 1 is closer to the base 2 side than that in the attitude in which the first arm 31 and the second arm 32 extend straight. Therefore, when the joint actuator 52 is attached and detached, the load applied to the robot 1 may be reduced.

Next, the joint actuator 51 will be briefly explained. As described above, the joint actuator 51 has the same configuration as the joint actuator 52, but mainly differs in position. As shown in FIG. 14, the joint actuator 51 is placed to be vertically inverted to the joint actuator 52, and the flange 9 is fixed to a second mounting surface 21 of the base 2. An opening 22 is formed in the base 2, the wave gearing 7 projects upward via the opening 22, and the coupling portion 761 of the circular spline 76 is fixed to a first mounting surface 313 of the first arm 31. The second mounting surface 21 and the first mounting surface 313 each face downward.

The attachment and the detachment of the joint actuator 51 are the same as those of the joint actuator 52 and will be briefly explained without illustration. First, the base 2 and the first arm 31 are fixed using a fixing member 100A. Then, the second screws B2 are approached from the upside of the first arm 31 and the second screws B2 are detached. Then, the first screws B1 are approached from the downside of the base 2 and the first screws B1 are detached. Then, the joint actuator 51 is pulled out downward and the joint actuator 51 is detached from the robot 1. Thereby, the detachment of the joint actuator 51 is completed.

The attachment method for the joint actuator 51 has a reverse procedure to the above described detachment method. That is, first, the joint actuator 51 is entered from the downside of the base 2 and mounted on the second mounting surface 21. Thereby, the wave gearing 7 projects upward via the opening 22 and the coupling portion 761 contacts the first mounting surface 313 of the first arm 31. Then, the flange 9 is approached from the downside and the flange 9 is fixed to the base 2 using the first screws B1. Then, the coupling portion 761 is approached from the upside, and the coupling portion 761 is fixed to the first arm 31 by the second screws B2. Thereby, the attachment of the joint actuator 51 is completed.

According to the above described steps, the joint actuator 51 may be easily attached and detached. Particularly, unlike the related art, the motor 6 and the wave gearing 7 may be integrally attached at the same time, and extremely high work efficiency may be exerted.

Next, the above described fixing member 100A will be explained. As shown in FIG. 15, the fixing member 100A has an L-shape and includes a bottom portion 110A and a wall portion 120A stood from an end of the bottom portion 110A. The fixing member 100A is attached from the upside, the bottom portion 110A is fixed to the upper surface of the base 2 by a sixth screw B6, and the wall portion 120A is fastened to the proximal end surface of the first arm 31 by a seventh screw B7. Thereby, the base 2 and the first arm 31 are fixed by the fixing member 100A.

Note that the fixing member 100A is not particularly limited as long as the member may fix the base 2 and the first arm 31. For example, as shown in FIG. 16, the fixing member 100A may be attached from the downside, the bottom portion 110A may be fastened to the side surface of the base 2 by the sixth screw B6, and the wall portion 120A may be fastened to the lower surface of the first arm 31 by the seventh screw B7.

As above, the robot 1 is explained. As described above, the robot 1 has the first arm 31 as a first member having the first mounting surface 311, the second arm 32 having the opening 322 located at the first mounting surface 311 side with respect to the first arm 31 and facing the first arm 31 and the second mounting surface 321 located at the opposite side to the first arm 31, and the joint actuator 52 coupling the first arm 31 and the second arm 32 and relatively pivoting the first arm 31 and the second arm 32. Further, the joint actuator 52 has the flange 9 fixed to the second mounting surface 321, the motor 6 placed at the opposite side to the first arm 31 with respect to the flange 9, and the wave gearing 7 as the reducer placed at the first arm 31 side with respect to the flange 9, projecting from the opening 322 to the first arm 31 side, and fixed to the first mounting surface 311. The width W3 of the opening 322 is smaller than the width W9 of the flange 9, the width W6 of the motor 6 is smaller than the width W9 of the flange 9, the width W7 of the wave gearing 7 is smaller than the width W3 of the opening 322. The joint actuator 52 is mounted on the second mounting surface 321 from the opposite side to the first arm 31, and thereby, the wave gearing 7 is projected from the opening 322 to the first arm 31 side. The flange 9 is fastened to the second arm 32 from the opposite side to the first arm 31 using the first screws B1, the wave gearing 7 is fastened to the first arm 31 from the opposite side to the second arm 32 using the second screws B2, and thereby, the first arm 31 and the second arm 32 are coupled. According to the structure, the joint actuator 52 may be detached from the robot 1 with the motor 6 and the wave gearing 7 remaining integrated by detachment of the first screws B1 and the second screws B2. On the other hand, the joint actuator 52 may be attached to the robot 1 with the motor 6 and the wave gearing 7 remaining integrated. Accordingly, the higher work efficiency may be exerted. Note that, here, the configuration in which the first member is the first arm 31, the second member is the second arm 32, and the joint actuator is the joint actuator 52 is described, however, the same applies to the configuration in which the first member is the first arm 31, the second member is the base 2, and the joint actuator is the joint actuator 51 (the same applies to the following description).

As described above, the attachment method for the joint actuator 52 is the attachment method for the joint actuator 52 coupling the first arm 31 as the first member having the first mounting surface 311 and the second arm 32 as the second member having the opening 322 located at the first mounting surface 311 side with respect to the first arm 31 and facing the first arm 31 and the second mounting surface 321 located at the opposite side to the first arm 31, and relatively pivoting the first arm 31 and the second arm 32. The joint actuator 52 has the flange 9 fixed to the second mounting surface 321, the motor 6 placed at the opposite side to the first arm 31 with respect to the flange 9, and the wave gearing 7 as the reducer placed at the first arm 31 side with respect to the flange 9, projecting from the opening 322 to the first arm 31 side, and fixed to the first mounting surface 311. The width W3 of the opening 322 is smaller than the width W9 of the flange 9, the width W6 of the motor 6 is smaller than the width W9 of the flange 9, and the width W7 of the wave gearing 7 is smaller than the width W3 of the opening 322. The method includes mounting the joint actuator 52 on the second mounting surface 321 from the opposite side to the first arm 31 and projecting the wave gearing 7 from the opening 322 to the first arm 31 side, fastening the flange 9 to the second arm 32 from the opposite side to the first arm 31 using the first screws B1, and fastening the wave gearing 7 to the first arm 31 from the opposite side to the second arm 32 using the second screws B2. According to the attachment method, the joint actuator 52 may be attached to the robot 1 with the motor 6 and the wave gearing 7 remaining integrated. Accordingly, the higher work efficiency may be exerted.

As described above, in the attachment method for the joint actuator 52, the joint actuator 52 is attached with the first arm 31 and the second arm 32 fixed by the fixing member 100. Thereby, the attachment of the joint actuator 52 is easier. Further, the relative position of the first arm 31 and the second arm 32 does not shift and calibration of the encoder 8 after attachment of the joint actuator 52 is unnecessary. Therefore, efforts for replacement or maintenance may be reduced and operation of the robot 1 may be restarted earlier after attachment of the joint actuator 52.

As described above, the detachment method for the joint actuator 52 is the detachment method for the joint actuator 52 coupling the first arm 31 as the first member having the first mounting surface 311 and the second arm 32 as the second member having the opening 322 located at the first mounting surface 311 side with respect to the first arm 31 and facing the first arm 31 and the second mounting surface 321 located at the opposite side to the first arm 31, and relatively pivoting the first arm 31 and the second arm 32. The joint actuator 52 has the flange 9 fixed to the second mounting surface 321, the motor 6 placed at the opposite side to the first arm 31 with respect to the flange 9, and the wave gearing 7 as the reducer placed at the first arm 31 side with respect to the flange 9, projecting from the opening 322 to the first arm 31 side, and fixed to the first mounting surface 311. The width W3 of the opening 322 is smaller than the width W9 of the flange 9, the width W6 of the motor 6 is smaller than the width W9 of the flange 9, and the width W7 of the wave gearing 7 is smaller than the width W3 of the opening 322. The flange 9 is fastened to the second arm 32 from the opposite side to the first arm 31 by the first screws B1, and the wave gearing 7 is fastened to the first arm 31 from the opposite side to the second arm 32 by the second screws B2. The method includes removing the second screws B2, removing the first screws B1, and pulling out the joint actuator 52 to the opposite side to the first arm 31. According to the detachment method, the joint actuator 52 may be detached from the robot 1 with the motor 6 and the wave gearing 7 remaining integrated. Accordingly, the higher work efficiency may be exerted.

As described above, in the detachment method for the joint actuator 52, the joint actuator 52 is detached with the first arm 31 and the second arm 32 fixed by the fixing member 100. Thereby, the detachment of the joint actuator 52 is easier.

As described above, the fixing member 100 fixing the first arm 31 and the second arm 32 when the joint actuator 52 is detached from the robot 1 or when the joint actuator 52 is attached to the robot 1 having the first arm 31 as the first member, the second arm 32 as the second member, and the joint actuator 52 coupling the first arm 31 and the second arm 32 and relatively pivoting the first arm 31 and the second arm 32, includes the first insertion hole 111 through which the fourth screw B4 as a screw used for fixing to the first arm 31 is inserted, and the second insertion holes 121, 131 through which the fifth screws B5 as screws for fixing to the second arm 32 are inserted. Thereby, the first arm 31 and the second arm 32 may be fixed by the simpler configuration.

As described above, the fixing member 100 does not overlap with the work paths L1 for attachment and detachment of the second screws B2 fixing the first arm 31 and the joint actuator 52 or does not overlap with the work paths L2 for attachment and detachment of the first screws B1 fixing the second arm 32 and the joint actuator 52. Thereby, the attachment and the detachment of the first screws B1 and the second screws B2 are not hindered by the fixing member 100, and the attachment and the detachment of the first screws B1 and the second screws B2 may be smoothly performed.

As described above, the fixing member 100 has the positioning portions 128, 138 for positioning with respect to the robot 1. Thereby, the attachment of the fixing member 100 to the robot 1 is easier.

As described above, the maintenance system used for the robot 1 fixes the first arm 31 and the second arm 32 by the fixing member 100 when the joint actuator 52 is detached from the robot 1 or when the joint actuator 52 is attached to the robot 1 having the first arm 31 as the first member, the second arm 32 as the second member, and the joint actuator 52 coupling the first arm 31 and the second arm 32 and relatively pivoting the first arm 31 and the second arm 32. Thereby, the first arm 31 and the second arm 32 do not shift during work, and the attachment and the detachment of the joint actuator 52 may be easily performed.

As above, the robot, the attachment method, the detachment method, the fixing member, and the maintenance system according to the present disclosure are explained based on the illustrated embodiments, however, the present disclosure is not limited to those. The configurations of the respective parts may be replaced by any configurations having the same functions. Or, any other configuration may be added to the present disclosure.

What is claimed is:

1. A robot comprising:
    a first member having a first mounting surface;
    a second member located at a first mounting surface side with represent to the first member, the second member having an opening facing the first member and a second mounting surface located at an opposite side to the first member;
    a joint actuator coupling the first member and the second member and relatively pivoting the first member and the second member;
    a first screw configured to fasten the joint actuator to the second member; and
    a second screw configured to fasten the joint actuator to the first member,
    the joint actuator having:
        a motor housing defining a flange fixed to the second mounting surface,
        a motor positioned in the motor housing, and placed at the opposite side to the first member with respect to the flange, and
        a reducer placed at a first member side with respect to the flange, projecting from the opening to the first member side, and fixed to the first mounting surface,
    wherein a width of the opening is less than a width of the flange and greater than a width of the reducer,
    a width of the motor is less than the width of the flange, and
    the first screw is configured to fasten the flange to the second member from the opposite side to the first member and the second screw is configured to fasten the reducer to the first member from an opposite side to the second member.

2. An attachment method for a joint actuator coupling a first member having a first mounting surface and a second member located at a first mounting surface side with respect to the first member, the second member having an opening facing the first member and a second mounting surface located at an opposite side to the first member, and the joint actuator relatively pivoting the first member and the second member,
    the joint actuator having:
        a motor housing defining a flange fixed to the second mounting surface,
        a motor positioned in the motor housing, and placed at the opposite side to the first member with respect to the flange, and
        a reducer placed at a first member side with respect to the flange, projecting from the opening to the first member side, and fixed to the first mounting surface,
    wherein a width of the opening is less than a width of the flange and greater than a width of the reducer, and
    a width of the motor is less than the width of the flange,
    the method comprising:
    mounting the joint actuator on the second mounting surface from the opposite side to the first member and projecting the reducer from the opening to the first member side;
    fastening the flange to the second member from the opposite side to the first member using a first screw; and
    fastening the reducer to the first member from an opposite side to the second member using a second screw.

3. The attachment method according to claim 2, wherein the joint actuator is attached with the first member and the second member fixed by a fixing member.

4. A detachment method for a joint actuator coupling a first member having a first mounting surface and a second member located at a first mounting surface side with respect to the first member, the second member having an opening facing the first member and a second mounting surface located at an opposite side to the first member, and the joint actuator relatively pivoting the first member and the second member,
    the joint actuator having:
        a motor housing defining a flange fixed to the second mounting surface,
        a motor positioned in the motor housing, and placed at the opposite side to the first member with respect to the flange, and
        a reducer placed at a first member side with respect to the flange, projecting from the opening to the first member side, and fixed to the first mounting surface,
    wherein a width of the opening is less than a width of the flange and greater than a width of the reducer,
    a width of the motor is less than the width of the flange,
    the flange is fixed to the second member from the opposite side to the first member by a first screw, and
    the reducer is fixed to the first member from an opposite side to the second member by a second screw,
    the method comprising:
    removing the second screw;
    removing the first screw; and
    pulling out the joint actuator to the opposite side to the first member.

5. The detachment method according to claim 4, wherein the joint actuator is detached with the first member and the second member fixed by a fixing member.

* * * * *